United States Patent [19]

Lerault et al.

[11] 3,985,970

[45] Oct. 12, 1976

[54] REGENERATION OF SIGNALLING PULSES

[75] Inventors: Raymond Lerault; Jean-Claude Bulte, both of Paris, France

[73] Assignee: Societe Lignes Telegraphiques et Telephoniques, Paris, France

[22] Filed: Apr. 11, 1975

[21] Appl. No.: 567,437

[52] U.S. Cl............................ 179/16 EA; 307/290; 328/164
[51] Int. Cl.² .......................................... H04Q 1/36
[58] Field of Search................... 179/16 E, 16 EA; 307/290, 246; 328/164

[56] References Cited
UNITED STATES PATENTS

| | | | |
|---|---|---|---|
| 3,378,701 | 4/1968 | Frank.................... | 307/290 |
| 3,571,626 | 3/1971 | Reif...................... | 307/290 |
| 3,573,503 | 4/1971 | Macey................... | 307/290 |
| 3,732,378 | 5/1973 | Chaumont et al........... | 179/16 EA |
| 3,808,467 | 4/1974 | Kawashima................. | 307/290 |

*Primary Examiner*—Kathleen H. Claffy
*Assistant Examiner*—Randall P. Myers
*Attorney, Agent, or Firm*—Kemon, Palmer & Estabrook

[57] ABSTRACT

Regeneration of distorted signalling pulses is obtained by means of a Schmitt trigger which is fired when the input pulse has varied by a preset value ΔV the maximum voltage of said pulse being stored in a memory device so as to maintain the trigger in the present state. The trigger is switched back during the trailing edge of the pulse when the signal has varied by the same preset value ΔV through inhibition of the memory device. The regeneration meets C.C.I.T.T. R2 regulation.

6 Claims, 8 Drawing Figures

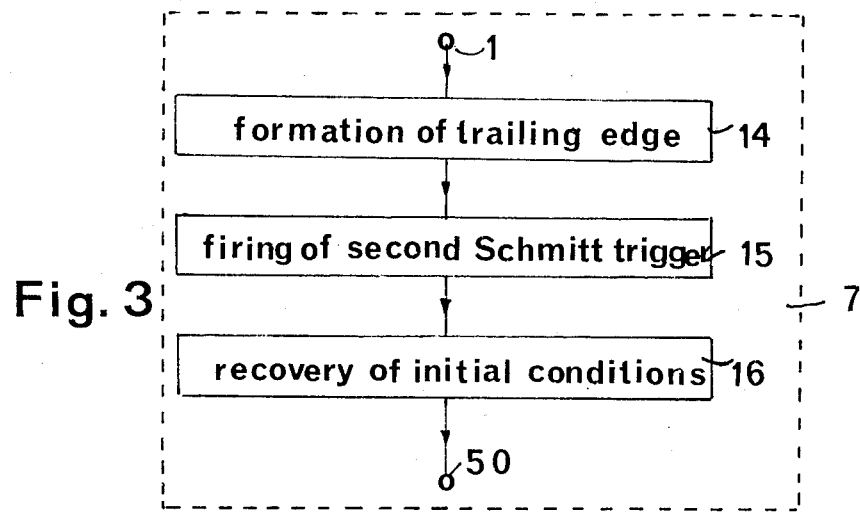
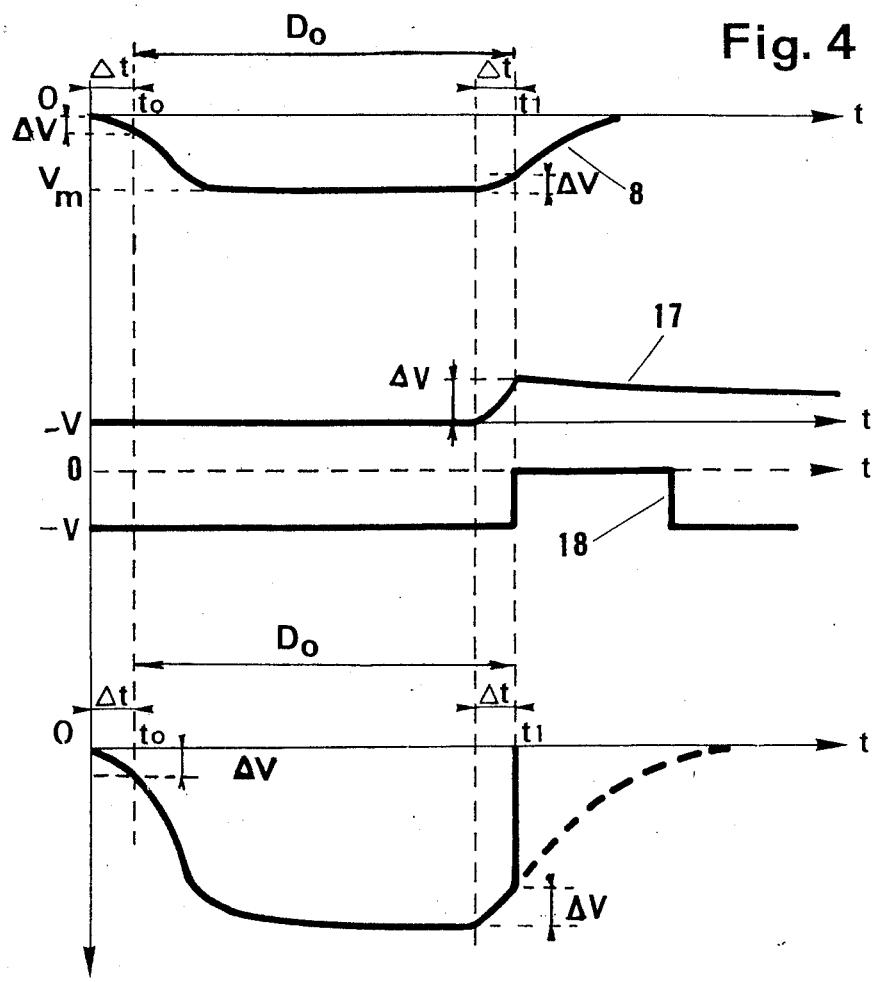

REGENERATION OF SIGNALLING PULSES

BACKGROUND OF THE INVENTION AND PRIOR ART

The invention concerns a method of regenerating the duration of pulses of random duration which are emitted by the automatic switching units of an automatic telephone network in analog communication systems. Such pulses modulate on an off-off basis a sinusoidal carrier whose frequency is outside the speech frequency range such as described in C.C.I.T.T. R2 for example. The pulse modulated carrier passes through narrow-band signal filters both at the signal transmitter and receiver which will cause deformations of the steep leading and trailing edges of the pulses. At the signal receiver, the input level of the signal may vary by a number of decibels on either side of the rated value, and this prevents any regeneration based on the signal level from being accurate if no special care is taken.

Devices have already been disclosed to regenerate signalling pulses. For example, French Pat. No. 2,094,739, applied for on the July 30, 1970, by the Societe Anonyme de Telecommunications, describes a method and the corresponding apparatus by which the signalling pulse can be transformed after detection into a pulse having steeper edges. The leading edge appears at the instant when the leading edge of the received signalling pulse reaches a preset value $V_o$, and the trailing edge appears at the instant at which the trailing edge of the pulse received reaches a value $V_o'$ which is substantially proportional to its peak voltage. By this method, it is possible to reduce the distortion of the duration of the pulse when its level varies. This device supplies a pulse in which the duration of the edges is a function of that of the edges of the input signal. When testing whether the signalling regenerator is operating satisfactorily, it is not possible to replace an input signal pulse by a slowly varying unidirectional voltage without producing an excessive energy dissipation in the retransmitter. Furthermore integration of this regenerator seems difficult.

BRIEF DISCLOSURE OF THE INVENTION

Signal pulses are non periodic, their duration may vary in a very large range according to the nature of the signalling to be performed : pulsing signals from dialling — ringing tone signals — engaged signal, etc... For the purpose of explanation they may be decomposed into two unit functions of opposite sense united by two steady states (d.c. voltages) corresponding respectively to the edges and the flats of the pulses. When such pulses are propagated through signalling filters (with a narrow bandwidth) the edges are distorted. If the frequency spectrum of such edges is considered, they are identical whether the edge is from a higher value to a lower one or vice-versa. For each frequency component the attenuation is the same for both edges. Therefore, the distortions of both edges after transmission are the same and the shapes of the edges are symmetrical with respect to an axis parallel to the constant amplitude axis and passing by $V_m/2$. This is shown on the first curve 8 of FIG. 2. The axis of symmetry is shown at X — X. This analysis holds when the duration of the edges is short with respect to the duration of the levels. However a study of the correction to be made when the duration of the edges becomes of the same order of magnitude as that of the levels shows that this symmetry is almost preserved at the beginning of the sloping edges. The basis for the invention lies on the above symmetry. The duration to be restored is considered to be the duration $D_o$ (FIG. 2) which elapses between the instant when the pulse has varied by a value $\Delta V$ from the first level value to the instant when the pulse has varied by the same value $\Delta V$ from the second level value. This holds true irrespective of the absolute value of $V_m/2$.

The present invention relates to a method and apparatus which are intended to eliminate the distortion of the duration on signal pulses and which will deliver pulses with constant slope edges which depend only on the design of the regenerator. Such regenerator consists of a well known Schmitt trigger. The input of the said trigger is connected to a control memory device which is connected to two parallel connected circuits, the first circuit which has a linear transfer function fills the memory and produces a first triggering action during the leading edge of the said signal pulses when a voltage variation $\Delta V$ is reached thus forming leading edges of the said regenerated pulses and the first levels the second circuit acting as an erase circuit for said memory device during the trailing edges of the said detected pulses when the same voltage variation $\Delta V$ has occurred which results in the formation of the trailing edges of the said regenerated pulses and the second levels by the return of the said Schmitt trigger to its initial operation.

In a preferred form of the method according to the invention, the said second circuit comprises successively, from the input, a circuit which is responsive only to the trailing edges of the input pulses and a second Schmitt trigger of which the triggering threshold has the same value as that of the Schmitt trigger used as the regenerator.

In a simplified variant of the method of the invention, the said second circuit comprises successively, from the input of the circuit means for derivating said detected pulses, storage means to hold the derivatives of the trailing edges only, means for integrating said derivatives and an output transistor.

The advantages of the pulse regenerating method according to the invention are the following:
 the circuit can be produced as an integrated circuit;
 the use of a Schmitt trigger as a regenerator makes it possible to deliver regenerated pulses with edges whose duration is independent of that of the edges of the input pulses. Consequently, the power necessary to the retransmitting circuit controlled by the device for the suppression of duration distortion according to the invention does not depend upon the duration of the edges of the input pulses.

Tests for checking satisfactory operation are possible without deterioration of the retransmitting circuit using a slowly varying unidirectional voltage as a simulation of the input pulses.

When the level of the input pulses varies within the generally accepted limits about the rated level, the duration distortion is substantially cancelled.

The apparatus for carrying out the method according to the invention eliminate duration distortion when the level of the detected signalling pulses is higher by at least 2 dB than the threshold of sensitivity of the signalling receiver.

DETAILED DESCRIPTION OF THE INVENTION

Figure 1:
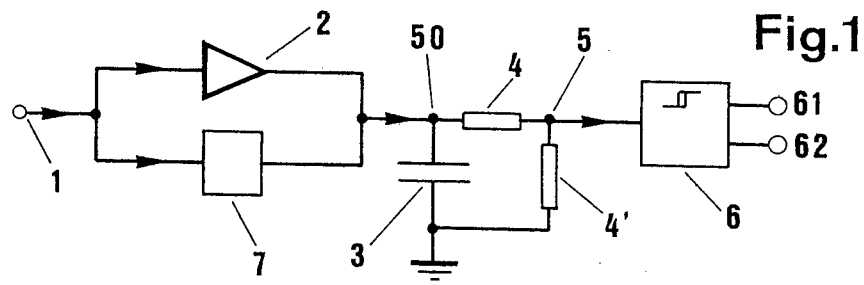
Figure 2:
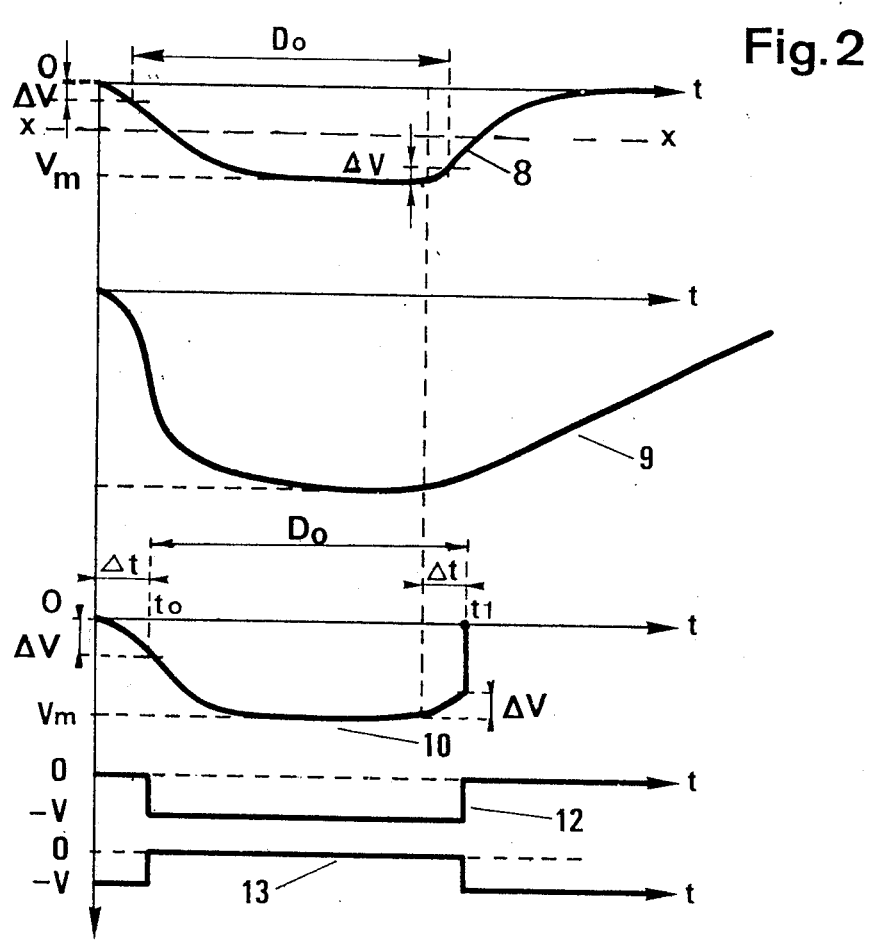
Figure 5:
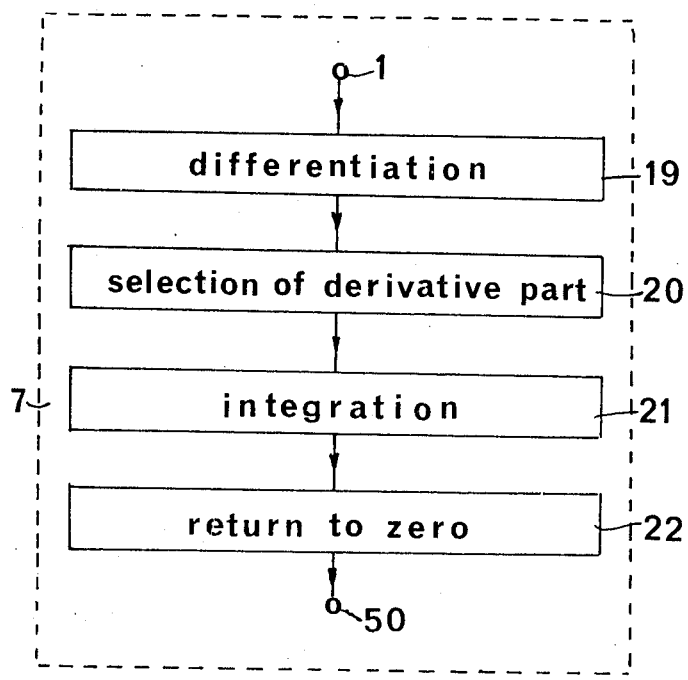
Figure 6:
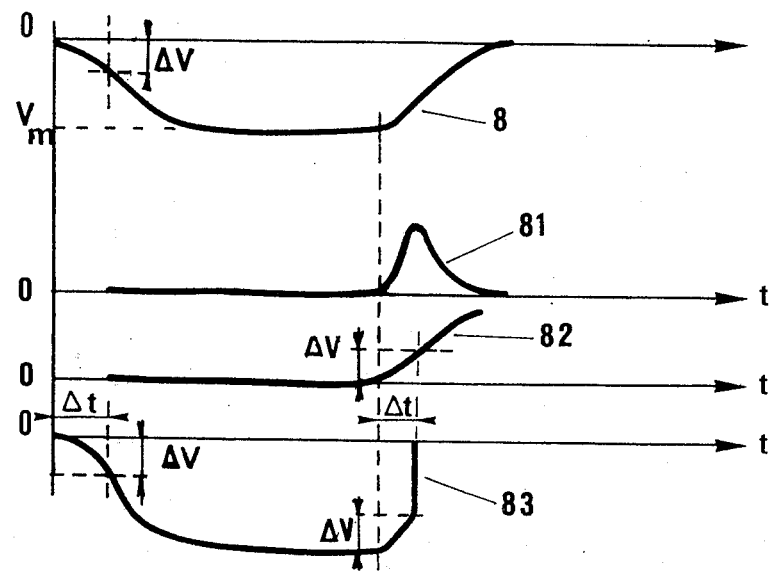
Figure 7:
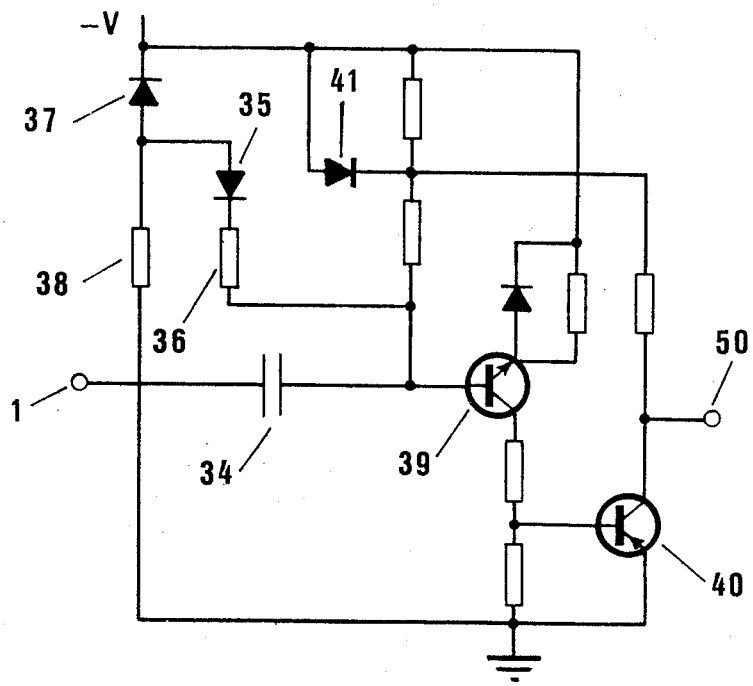
Figure 8:
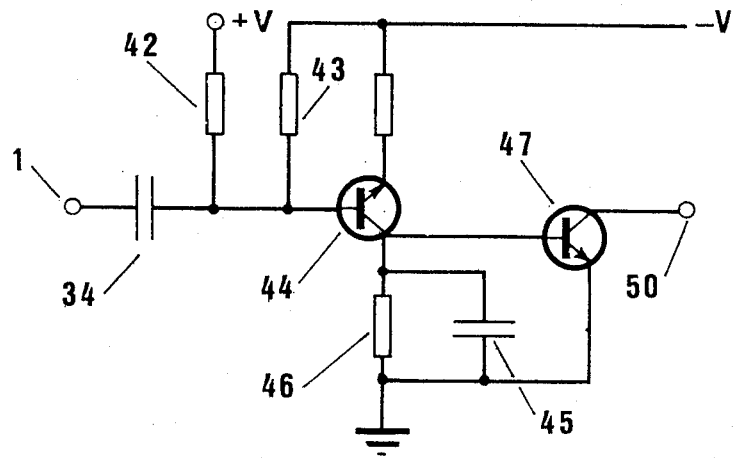

Further features and advantages of the method according to the invention and of the apparatus for the application thereof will become apparent from the description illustrated by FIGS. 1 to 8 which are given by way of non-limiting illustration and in which:

FIG. 1 is the block diagram of the circuits for the application of the method according to the invention, FIG. 2 illustrates the form of the voltages in the main stages of the method according to the invention, FIG. 3 illustrates the succession of operations performed in the method according to the invention, FIG. 4 shows the curves of the variation of the voltages at the different steps of FIG. 3, FIG. 5 illustrates the succession of operations performed in accordance with a variant of the method according to the invention, FIG. 6 illustrates the curves of the variation of the voltages at the different steps of FIG. 5, FIG. 7 is the electric circuit diagram of circuit 7 of FIG. 1 employed in the preferred embodiment of the method according to the invention, and FIG. 8 is the electric circuit diagram of circuit 7 of FIG. 1 employed in a modified embodiment of the method according to the invention.

FIG. 1 illustrates a first D.C. linear current amplifier 2 connecting the input 1 of the circuit for the regeneration of the detected signal pulses and one of the electrodes 50 of a storage capacitor 3 having its second electrode connected to earth. Two resistors 4 and 4' are connected in parallel with the capacitor 3. The point 5 common to 4 and 4' is connected to the input of a Schmitt trigger 6, of which the complementary output terminals 61 - 62 may be used to control a retransmitting circuit not shown. A second network 7 is provided between the input 1 and the electrode 50 of the storage capacitor 3.

The method of regenerating signal pulses according to the invention has been described with reference to FIG. 2. Let us consider a signal pulse emanating from the automatic switching unit which has a duration $D_o$ curve 8. As has already been explained in the foregoing, this pulse modulates a carrier frequency on an on-off basis. The modulated carrier is filtered before transmission along the line. At the receiving end it is filtered again and detected and amplified. The received or input pulse has a shape as illustrated on curve 8. The trailing edges of pulse 8 is obtained from the leading edge by symmetry with respect to X — X and translation of value $D_o$ along the same axis. In another way, the pulse passes through the amplitude $\Delta V$ and $V_m - \Delta V$ at instants $t_o$ and $t_1$ which are $D_o$ apart whatever be $V_m$ (level amplitude of the received pulse).

The curve 9 represents the voltage across the terminals of the capacitor 3, which is almost instantaneously charged through amplifier 2 having low output impedance, while the discharge takes place very slowly through the resistors 4 and 4' with a time constant which is very much greater than the duration of the edges, capacitor 3, performing the function of a memory circuit. The Schmitt trigger is fired a first time at the instant $t_o$ with a delay $\Delta t$ in relation to the beginning of the leading edge, when the voltage at the point 5 reaches the triggering threshold value $-\Delta V$. It returns to its initial condition at the instant $t_1$ when the circuit 7 suddenly discharges the storage capacitor 3. The instant $t_1$, which follows by a duration $\Delta t$ the commencement of the trailing edge of the signal pulse, as illustrated on the curve 10 of FIG. 2, is set by the circuit 7.

The curve 12, which represents the collector voltage of a first transistor of the Schmitt trigger (terminal 61 of FIG. 1, for example), is the regenerated output pulse of duration $D_o$.

The curve 13, which represents the collector voltage of the second transistor of the Schmitt trigger (terminal 62 of FIG. 1) is complementary to the first in a time interval equal to the signalling period. Either of these pulses may serve to control the retransmitter depending on whether the polarity employed in the transmission is positive or negative.

FIG. 3 illustrates the sequence of operations performed in the circuit 7 in accordance with the preferred embodiment of the invention. This sequence is made up as follows:

14 — formation of a voltage varying as the trailing edge of the pulse received up to the value $\Delta V$, and then decreasing exponentially, as is illustrated on the curve 17 of FIG. 4.

15 — firing of a second Schmitt trigger made of complementary transistors, which is included in circuit 7, which connects a very low impedance across capacitor 3 and discharges the latter at high speed. The threshold of the trigger is the same as that of trigger 6.

16 — return to the initial condition of the second Schmitt trigger.

FIG. 4 shows at 8 a detected signal pulse as applied to the input 1. The curve 17 represents a voltage increasing from zero according to the trailing edge of the pulse. This increase is interrupted by the second Schmitt trigger when the voltage variation reaches the threshold value $\Delta V$. There has then elapsed, from the beginning of the trailing edge, a duration $\Delta t$ equal to that which has elapsed between the beginning of the leading edge and the instant when the voltage variation has reached the same value $\Delta V$, as has already been explained in the foregoing. The level of the pulse 18 represents the duration for which the potential difference across the terminals of the capacitor 3 is kept equal to zero. This period is so fixed as to be slightly prolonged after the end of the trailing edge of the pulse 8. Any firing of the trigger 6 during the end of this edge is thus avoided.

FIG. 5 illustrates the sequence of the operations performed in the circuit 7 in accordance with a modified embodiment of the method of the invention. This sequence thus comprises:

19 — differentiation of the input pulse;

20 — selection of that part of the derived signal which corresponds to the trailing edge of the input pulse and amplification;

21 — integration of the preceding voltage;

22 — sudden discharge of the capacitor 3.

FIG. 6 illustrates at 8 a signal pulse as applied to the input 1. The curve 81 represents the derivative of the trailing edge of the pulse 8, which alone has been retained in the course of the operation 20. The curve 82 represents the voltage resulting from the integration of that represented on the curve 81, it being similar to that of the trailing edge of the pulse 8 to within a constant. When a signal represented by the curve 82 has varied by $\Delta V$, it turns on the transistor which terminates the circuit 7, which results in discharge of the storage capacitor 3 of FIG. 1. The curve 83 represents the voltage at the point 50 (FIG. 5). The curve 82 shows that the capacitor 3 cannot be recharged by the end of the trailing edge of the pulse 8.

FIG. 7 is the electric circuit diagram of the circuit 7 employed in the preferred embodiment of the method shown in FIGS. 3 and 4. It comprises:

a capacitor 34 charged through a diode 35 and a series resistor 36, which are themselves connected to a diode 37 in series with a resistor 38;

a complementary-transistor Schmitt trigger consisting of the transistors 39 and 40; and a diode 41 connected in the collector circuit of 40, which may optionally be replaced by a transistor.

The circuit of FIG. 7 operates as follows: when a pulse such as that shown at 8 in FIG. 4 is applied to the point 1, during the leading edge thereof, the capacitor 34 is charged to the peak voltage of the detected pulse through the very low impedance of diode 35 in the forward direction and transistor 39 remains non-conducting. During the trailing edge of the pulse 8, diode 35 is no longer conducting and the charge accumulated in the capacitor 34 sets up at the base of the transistor 39 a voltage represented by the beginning of the curve 17 of FIG. 4, which increases as a function of time in exactly the same way as the trailing edge of the pulse 8. When the voltage variation reaches the value $\Delta V$ (cf. curve 17), the complementary-transistor Schmitt trigger is fired a first time and the collector of the transistor 40 connected to the capacitor 3 is brought to earth potential, as shown on the curve 18.

FIG. 8 is the electric circuit diagram of the network 7 employed in the variant of the method shown in FIGS. 5 and 6. It comprises a capacitor 34, of which one terminal is connected to the input 1 and the other two resistors 42 and 43 connected respectively to a general supply and at an intermediate point of a supply potentiometer which provides the necessary bias to a transistor 44. In the collector circuit of the transistor 44 there are situated a capacitor 45 and a leakage resistor 46. The time constant RC of the circuit 45, 46 is equal to a few milliseconds. An output transistor 47, the base and the emitter of which are connected to the terminals of the capacitor 45, is connected by its collector to the output 50.

When a pulse such as that shown at 8 in FIG. 2 arrives at the input 1, the capacitor 34 and the two resistors 42 and 43 constitute a differentiating circuit, which performs the differentiating operation 19 of FIG. 5. The transistor 44 which is class AB biased amplifies only that portion of the derivative which corresponds to the trailing edge of the curve 8, in accordance with the operation 20. The capacitor 45 which stores the current supplied by the transistor 44 performs the integrating operation, as illustrated by curve 82. It thereafter discharges exponentially through resistor 46 for a period which is about four times as great as that of the edges of the detected pulse. The transistor 47 performs the operation 22 consisting of short-circuiting the capacitor 3 at the instant $t_1$, as can be seen on curve 83.

What we claim:

1. A method for regeneration of signal pulses in an analog communication system by means of a D.C. linear current amplifier coupled to a memory which is coupled to the input of a Schmitt trigger and a return to zero circuit coupled to said memory, characterized by the following steps occurring at each signal pulse:
    developing a first voltage reproducing the leading edge of the signal pulse and applying said voltage to said memory;
    first firing said Schmitt trigger by said first voltage at threshold $\Delta V$;
    generating in said return to zero circuit a second voltage presenting a build up time reproducing the trailing edge of the signal pulse; and
    returning to zero the voltage remaining in said memory when said second voltage reaches the $\Delta V$ value causing a second firing of said Schmitt trigger.

2. A method according to claim 1 wherein said second voltage reaches the $\Delta V$ value and then exponentially decreases and return to zero of the voltage remaining in said memory is achieved by the following sequence:
    first firing a second Schmitt trigger connected by its output to said memory having said $\Delta V$ value as first threshold;
    maintaining said second Schmitt trigger in the fired state during the exponential decrease of said second voltage; and
    second firing said second Schmitt trigger when said second voltage crosses the second threshold voltage.

3. A method according to claim 1 wherein said second voltage is generated by the following sequence:
    differentiating said signal pulses;
    selecting that part of the derivative of signal pulse which corresponds to the trailing edge; and integrating said selected part.

4. Apparatus for restoring signal pulses in an analog communication system comprising:
    a D.C. linear current amplifier;
    a memory;
    a return to zero circuit connected in parallel with said amplifier for erasing said memory;
    means coupling said memory to the common output of said amplifier and return to zero circuit;
    a Schmitt trigger having its input connected to said memory and generating restored signal pulses at its output; and
    means for connecting an input signal to the common input of said amplifier and return to zero circuit.

5. Apparatus according to claim 4 in which said return to zero circuit comprises a second Schmitt trigger circuit of the complimentary transistor type and a series connected diode and resistor connected to the input of said second trigger for eliminating the leading edge of each signal pulse.

6. An apparatus according to claim 4 wherein said return to zero circuit comprises a first capacitor-resistor circuit, for differentiating each signal pulse coupled to the base electrode of a first transistor connected as a class AB amplifier, a second capacitor-resistor circuit coupled in series with the collector of said first transistor acting as an integrating circuit and a second transistor having its base and emitter electrodes respectively connected in parallel with said integrating circuit and its collector electrode coupled to said memory.

* * * * *